United States Patent [19]

Clayton et al.

[11] Patent Number: 5,406,032
[45] Date of Patent: Apr. 11, 1995

[54] APPARATUS AND METHOD FOR SUPPORTING WIRE BUNDLES WITHIN A STRUCTURE

[75] Inventors: Dennis F. Clayton, Kent; Robert B. Wyke, Kirkland, both of Wash.

[73] Assignee: The Boeing Company, Seattle, Wash.

[21] Appl. No.: 836,499

[22] Filed: Feb. 13, 1992

[51] Int. Cl.⁶ .................... H01B 17/26; H02G 3/22
[52] U.S. Cl. .................... 174/151; 174/65 G; 174/92; 248/56
[58] Field of Search ........... 174/151, 146, 157, 138 E, 174/92, 99 R, 65 G, 88 C, 89; 248/56

[56] References Cited

U.S. PATENT DOCUMENTS

| | | | |
|---|---|---|---|
| 1,856,109 | 5/1932 | Murray | 174/146 |
| 2,813,692 | 11/1957 | Bremer et al. | 248/56 |
| 2,945,085 | 7/1960 | Billups | 248/56 |
| 3,240,502 | 3/1966 | Snyder | 248/56 |
| 4,804,197 | 2/1989 | Drbal | 174/65 G X |

FOREIGN PATENT DOCUMENTS 1473304  3/1967  France .................... 174/151

Primary Examiner—Leo P. Picard
Assistant Examiner—Hyung S. Sough
Attorney, Agent, or Firm—Robert H. Sproule

[57] ABSTRACT

A device for supporting wire bundles which pass through an opening of a structural element such as the tracks of an airplane slat. The device includes an inside spacer element which both supports and spaces apart the individual wire bundles. The spacer is supported within a hollow split bolt which is formed by two half cylinders which are held together by detachable connectors as well as by a split locking nut which is screwed onto a threaded end of the split bolt. The nut is also formed by the joining of two half nuts which are held together by detachable connectors. In this manner, the supporter can be installed around wire bundles which are already in place through the structure opening.

20 Claims, 3 Drawing Sheets

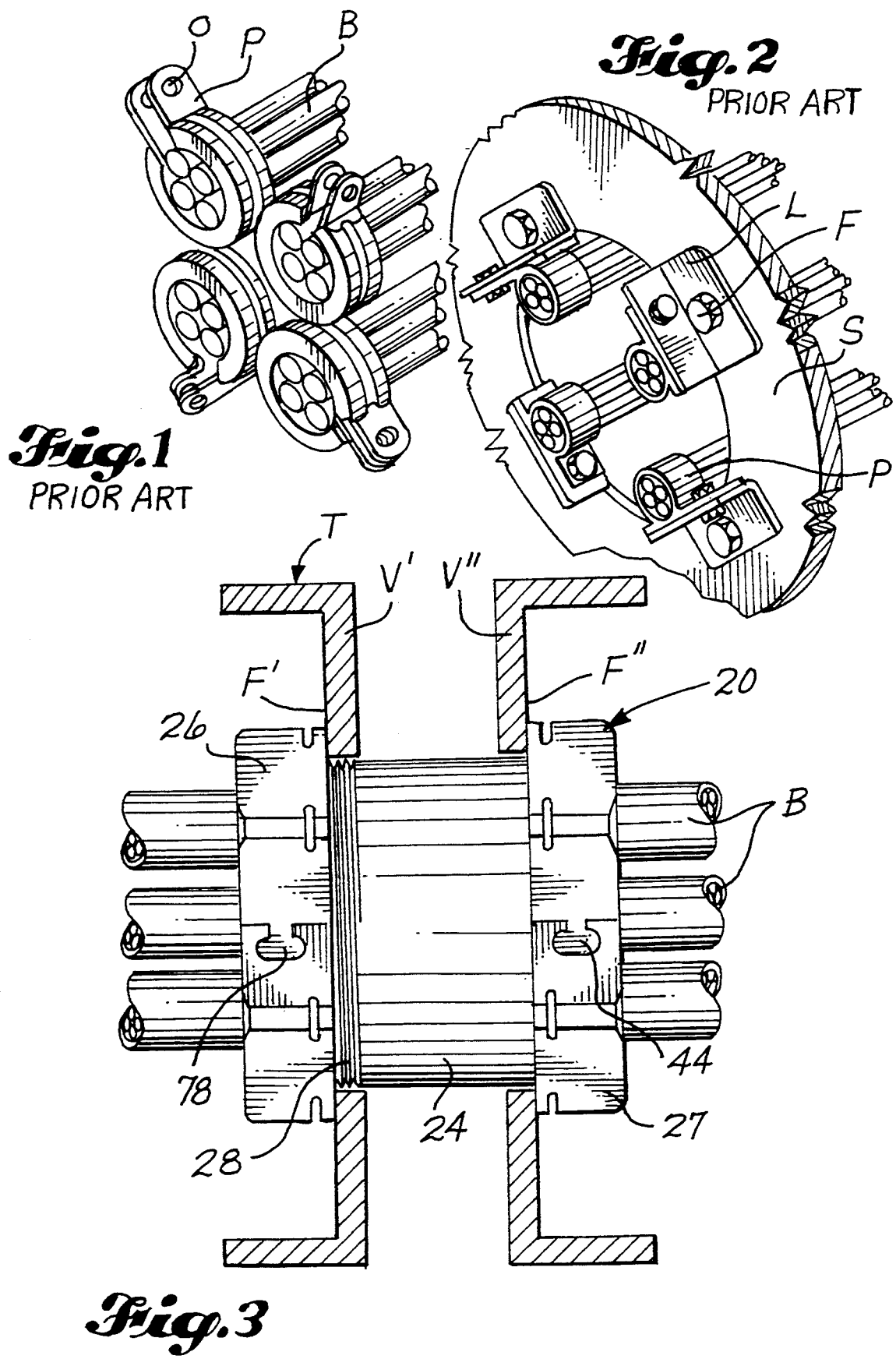

APPARATUS AND METHOD FOR SUPPORTING WIRE BUNDLES WITHIN A STRUCTURE

TECHNICAL FIELD

The present invention pertains to a device for supporting within a structural component one or more wire bundles which are fed through an opening in the structural component.

BACKGROUND OF THE INVENTION

In certain equipment it is necessary to feed bundles of wires to different operating components. Often there will be openings within the structure of this equipment through which the wire bundles are fed and supported. However, due to movement and vibration within the equipment, it is necessary to support the wire bundles. This is necessary to prevent fraying of the wire insulation and exposure of the wire which could result if the bundles were allowed to chafe against the equipment's structure.

In commercial aircraft, for example, wire bundles are fed outboard from the fuselage through the wing. These wire bundles carry signals between various control devices in the fuselage and wing mounted systems such as engines, flaps and slats. However to reach these operating systems, the bundles must be fed through openings in wing ribs, support tracks and the like. Furthermore, to prevent the wire bundles from chafing due to vibration and movement of the wing, the wire bundles have traditionally been supported by "P" clamps which in turn are fastened to the aircraft structure.

Using this conventional method, each wire bundle must be supported by a separate P clamp so as to provide spacing between the wire bundles as well as between the wire bundles and the airplane structure. Sometimes there are as many as six wire bundles which must be fed through a single opening and which must be supported by six separate P clamps. Due to the large number of P clamps required, it is sometimes necessary that the hole have an oblong configuration in order to accomodate all of the wire bundles. This reduces the overall strength of the structure. Furthermore it is time consuming to attach individual P clamps around each wire bundle and to fasten each of the P clamps to the aircraft structure.

This conventional method is particularly burdensome when it becomes necessary to support the wire bundles within openings in the airplane slat support tracks. Typically, these tracks are very close together, sometimes only about two inches apart.

A number of conventional support devices have been disclosed. For example, in U.S. Pat. No. 730,251 by Gibbs there is disclosed a sheath having "+" shaped elements therein for supporting electrical wire. Furthermore, U.S. Pat. No. 919,913 by Miller discloses a pipe connector including a threaded divided gland which is inserted inside a threaded recess of a connecting part and which grasps a portion of the pipe.

SUMMARY OF THE INVENTION

The present invention pertains to apparatus and methods for supporting a wire element through an opening in a structure. The apparatus includes means, such as a spacer element, for engaging the wire element to resist movement thereof. In addition, the apparatus includes a bolt which is inserted into the structure opening. The bolt has (i) a head portion which engages the structure and (ii) a shaft portion including an internal passageway which supports the wire engaging means, e.g., spacer element, therein such that the bolt engages the wire engaging means. Furthermore, there is a nut which is attached to the bolt in a manner that the nut engages the structure to secure the apparatus to the structure between the nut and the head portion. In addition, the nut engages the wire engaging means to secure the wire engaging means inside the passageway between the nut and the bolt.

BRIEF DESCRIPTION OF THE DRAWINGS

These and other features and advantages of the present invention will be described in the following detailed description in conjunction with the attached drawings, in which:

FIG. 1 is a perspective view of four wire bundles which are supported by conventional P clamps;

FIG. 2 is a perspective view of four conventional P clamps which are attached to aircraft structure by conventional L flanges;

FIG. 3 is a top view of an exemplary embodiment of the present invention;

DETAILED DESCRIPTION

Figure 4:
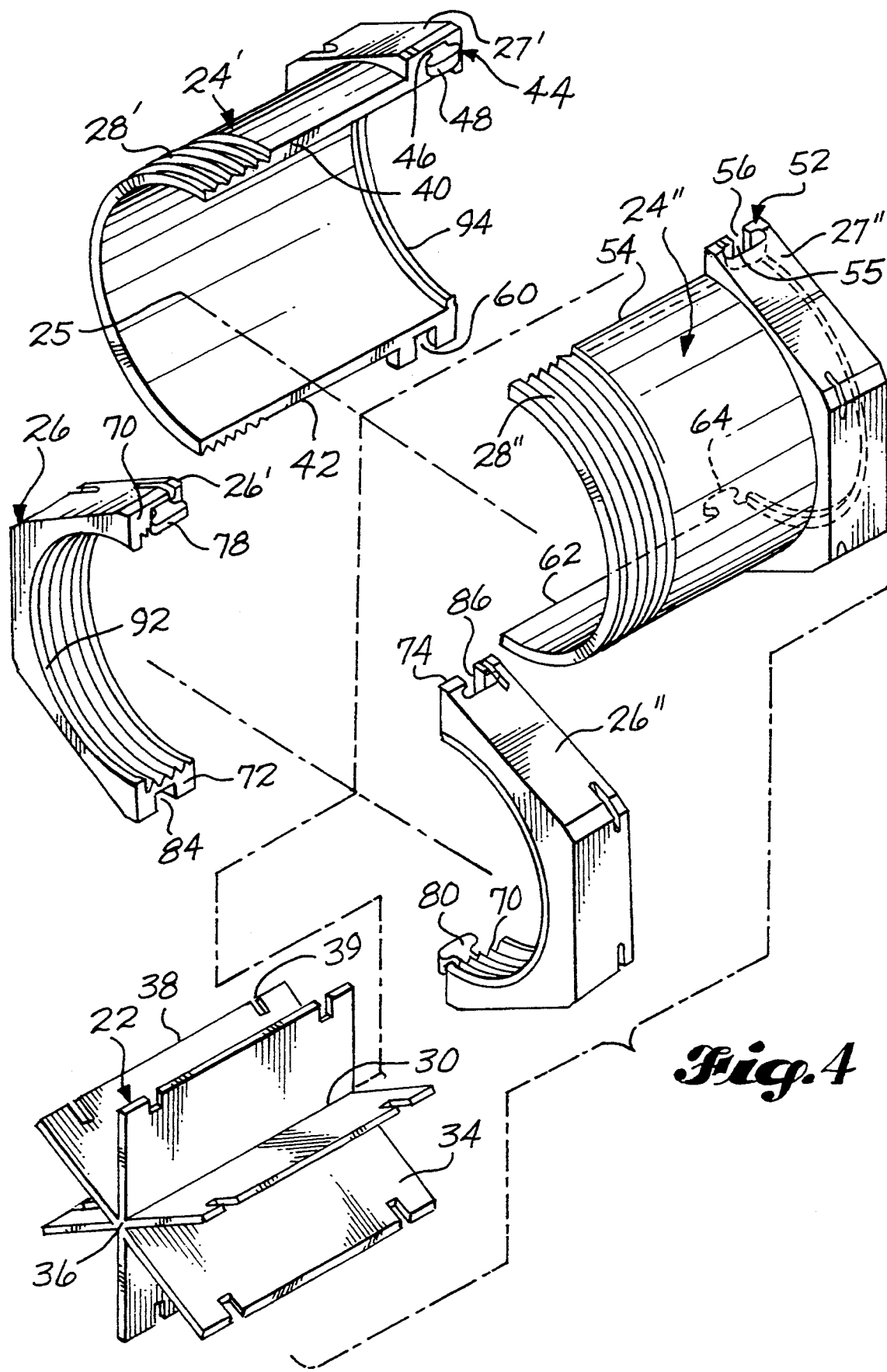
FIG. 4 is an exploded view of the present embodiment.

The present invention pertains to an apparatus and method for supporting one or more wire-like bundles within an opening in a structure. In the present detailed description, an exemplary embodiment of the present invention will be described wherein the present invention is used to support wire bundles within an opening in a slat support track of an airplane. It should be appreciated, however, that the present invention is not limited to the exemplary embodiment described in this detailed description.

Before describing the present invention in further detail, an additional brief description of the conventional P clamp method introduced in the Background of the Invention will be provided. Referring first to FIG. 1, there is shown a number of wire bundles B each of which is supported by a respective "P" clamp designated by the letter P. Located at the base of each P clamp are a pair of openings O through which a fastener screw (not shown) is inserted. In order to fasten the P clamps to aircraft structure, each P clamp is fastened (through openings O) to a respective L flange (designated by the letter L in FIG. 2). In turn, the respective L flanges are fastened by fasteners F to the aircraft structure (designated by the letter S), such as an aircraft slat track.

Having discussed the foregoing conventional method, attention now will be turned to the present invention. Referring first to FIGS. 3 and 5, there is shown a cable/wire feed-through supporter indicated at 20 which supports wire/cable bundles B through openings in a slat track T which includes vertical track beams V. As shown more clearly in FIG. 4, the supporter 20 includes an inner spacer star 22, a hollow split bolt 24, and a hexagonal split nut 26. Furthermore, the hollow split bolt 24 includes two mirror image half bolts 24', 24" which when joined together form a cylindrical shaft portion having a cylindrical internal passageway 25. The shaft portion is threaded at an end 28 (FIG. 3) and attached at its opposite end to a hexagonal-shaped head portion 27. Likewise, the hexagonal split nut 26 is formed by two mirror image elements 26', 26" each having a circular threaded inner surface.

The spacer star 22 includes a number of V-shaped valleys 30, each of which supports one wire bundle B. During installation, typically the wire bundles B are first fed through the openings in the track beam V. Following this, the spacer star 22 is slid into a track beam opening in a manner that there is only one wire bundle B per valley 30. Once this is accomplished, the half bolts 24', 24" are mated together (in a manner to be described later) about the wire bundle at the right side of the track beam V (in FIG. 3) and slid into the track beam opening from the right to the left. Following this, the half nuts 26', 26" are mated together about the wire bundles at the left side of the track beam V and screwed onto the threaded end 28 of the hollow bolt 24 until the nut 26 and the head 27 of the bolt engage respective left, right track beams V in an interference fit. In this manner, the feed-through supporter 20 is held in place on the track.

Figure 5:
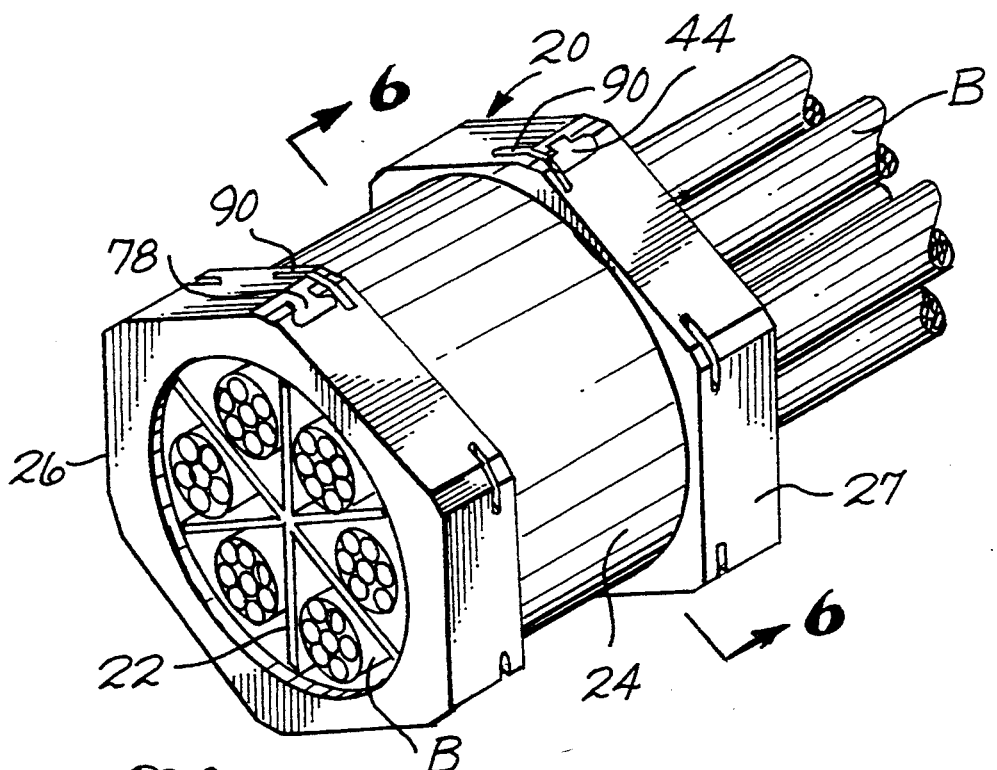
FIG. 5 is a perspective view of the present embodiment.

In order to describe the present invention in more detail, reference is made to FIG. 4 which shows an exemplary embodiment of the spacer star 22 formed by a number of rectangular panels 34 which are connected together at each of their respective lengthwise edges to define a centerline 36. Each of the panels' opposite lengthwise edges 38 are spaced laterally apart at generally equal intervals so as to form the valleys 30 therebetween. In order to receive a retainer wire (not shown) for holding the wire bundles firmly within the valleys 30, notches 39 are provided along the edges 38 of the panels. The retainer wire is wrapped circumferentially around the spacer star 22 at the notches 39 to engage the wire bundles therein. It should be appreciated that other shapes of spacers may be used, depending upon, for example, the number of wire bundles which are required to be separated and supported.

Figure 7:
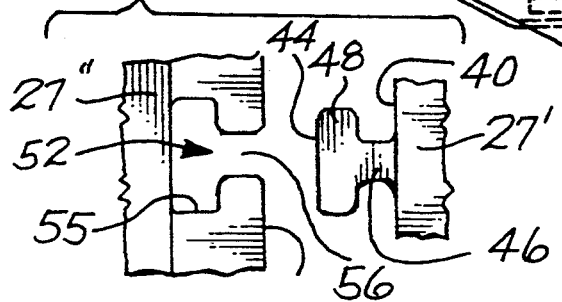
FIG. 7 is a side view of a portion of the present embodiment in a disconnected position.
Figure 8:
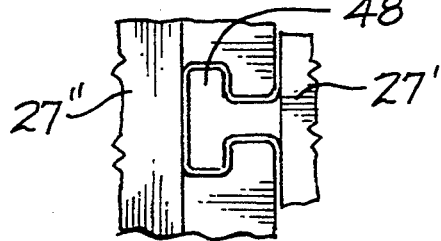
FIG. 8 is a side view of the portion of the present embodiment shown in FIG. 7 in a connected position.

Still referring to FIG. 4, the half bolt 24' includes an upper lengthwise edge 40 and a lower lengthwise edge 42. Projecting from the edge 40 at the head 27 is a male connector 44 having a neck 46 to which there is attached an oval body 48. As shown more clearly in FIG. 5, the half bolts 24', 24" are joined together by inserting the male connector 44 into a female receptacle 52 which is located in an upper edge 54 (at the head 27") of the half bolt 24". More specifically, the receptacle 52 (FIG. 7 and 8) includes an oval slot 55 which receives the oval body 48 of the male connector therein. Furthermore, the oval slot 55 communicates with the edge 54 through a small channel 56 which receives the connector neck 46 therein.

In order to hold both edges of each half bolt together, the bottom edge 42 of half cylinder 24' (at the head 27) includes a female receptacle 60 which is identical to the receptacle 52. In addition, a bottom lengthwise edge 62 of the half bolt 24" includes a male connector 64 at the head 27" which is identical to the male connector 44. When the half bolts 24', 24" are joined together, the male connector 64 is positioned inside the female receptacle 60.

In order to hold the male connectors 44, 64 within the respective receptacles 52, 60, the nut 26 is screwed over the threaded portion 28 of the bolt. However, prior to this, the half nut 26' is joined with the half nut 26". As shown in FIG. 4, the half nut 26' includes an upper end face 70 and a lower end face 72 whereas the half nut 26" includes an upper end face 74 and a lower end face 76. Attached to the upper end face 70 and the lower end face 76 are respective male connectors 78, 80 which are identical to the connector 44. In addition, located in the end faces 72, 74 are respective slots 84, 86 which are identical to the slot 52. When the half nuts 26', 26" are joined together, connectors 78, 80 are positioned inside slots 86, 84 respectively.

Until the locking nut 26 is screwed onto the bolt 24, the half nuts and half bolts are manually held together to prevent the male connectors from sliding vertically out of the female receptacles. However, once the locking nut 26 is screwed onto the bolt 24, vertical movement of the half nuts relative to each other and the half bolts relative to each other is prevented. In this manner, the various components of the supporter 20 are held in place.

Figure 6:
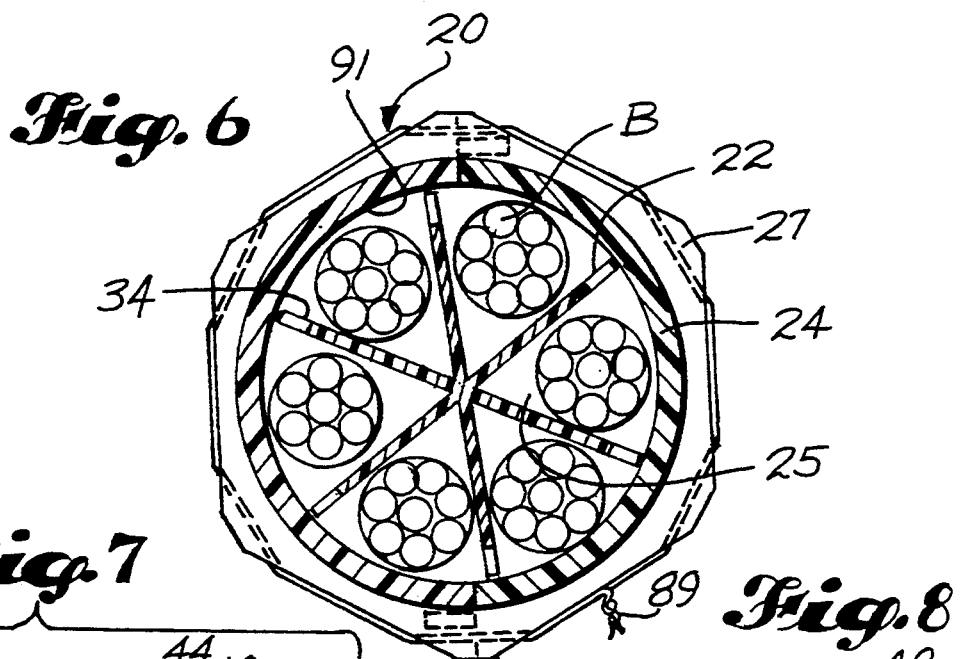
FIG. 6 is a sectional end view of the present embodiment taken along line 6—6 of FIG. 5.

In another exemplary embodiment, a number of retaining grooves 90 are located in the head 27 and locking nut 26 for receiving therein a snap ring (not shown) or lock wire 89 (FIG. 6).

As shown most clearly in FIG. 3, the locking nut 26 is screwed onto the bolt 24 until an inner face (not shown) of the locking nut engages an outer face F' of the left vertical beam V' and until an inner face of the bolt head 27 engages an outer face F" of the right vertical beam V".

As shown best by FIG. 6, the wire bundles are spaced apart yet held securely by the supporter 20. More specifically, the spacer 22 is configured so that each wire bundle B is held securely between the panels 34 and an inner surface 91 of the bolt passageway. The spacer 22 is held within the passageway 25 between (i) an upstanding lip 92 (FIG. 4) which extends about the inner circumference of the nut 26 at the left end thereof and (ii) an upstanding lip 94 which extends about the inner circumference of the bolt head 27 at the right end thereof.

It should be appreciated that the supporter 20 can be installed around wire bundles which are already in place and without having to thread the bundles through the supporter. On the other hand, the supporter 20 can be installed first in the structure opening and the wire bundles fed through the supporter.

What is claimed is:

1. Apparatus for supporting a wire element through an opening in a structure, the apparatus comprising:
   a. means for engaging the wire element to resist movement thereof;
   b. a bolt adapted to be inserted through the structure opening, the bolt having (i) a head portion adapted to engage the structure and (ii) a shaft portion including an internal passageway which supports the wire engaging means therein such that the bolt engages the wire engaging means, the bolt including a first portion and a second portion which are movable between a first position wherein the first and second bolt portions are separated apart and a second position wherein the first and second bolt portions are joined together about the wire engaging means; and c. a nut which is attached to the bolt in a manner that the nut engages (i) the structure to secure the apparatus to the structure between the nut and the head portion, and (ii) the wire engaging means to secure the wire engaging means inside the passageway between the nut and the bolt, the nut including a first portion and a second portion, each portion having means for joining the first nut portion and the second nut portion together about the bolt such that nut and bolt cooperatively interact so that the first bolt portion and the second bolt portion are held together by the nut, and the first nut portion and the second nut portion are held together by the bolt.

2. The apparatus as set forth in claim 1 wherein:
   a. the nut includes a lip at the inside thereof which engages the wire engaging means;
   b. the bolt includes a lip at the inside thereof which engages the wire engaging means; and
   c. the wire engaging means is secured inside the passageway between the bolt lip and the nut lip.

3. The apparatus as set forth in claim 1 wherein the wire engaging means includes a spacer which extends across the internal passageway of the bolt in a manner to engage the wire element.

4. The apparatus as set forth in claim 3 wherein:
   the spacer is able to separate the wire element into two groups inside the passageway.

5. A method of supporting a wire element through an opening in a structure, the method comprising the steps of:
   a. placing the wire element through the opening;
   b. inserting a spacer inside the opening such that the spacer engages the wire element to resist movement thereof;
   c. placing a first bolt element and a second bolt element about the wire element;
   d. attaching the first bolt element to the second bolt element to form a bolt having an internal passageway;
   e. inserting the bolt through the opening such that the spacer is located inside the internal passageway;
   f. placing a first nut element and a second nut element about the wire element;
   g. attaching the first nut element to the second nut element to form a nut; and
   h. attaching the nut to the bolt in a manner that the bolt and nut engage the structure therebetween and such that the nut and bolt interact so that first bolt element and the second bolt element are held together by the nut, and the first nut element and the second nut element are held together by the bolt.

6. The method as set forth in claim 5 wherein during the step of attaching the nut to the bolt, the nut and bolt engage the spacer therebetween to secure the spacer in the bolt passageway.

7. The method as set forth in claim 5 wherein:
   a. during the step of attaching the first bolt element to the second bolt element, the first bolt element and the second bolt element are prevented from separating apart except along a first axis;
   b. during the step of attaching the first nut element to the second nut element, the first nut element and the second nut element are prevented from separating apart except along a second axis; and
   c. during the step of attaching the nut to the bolt, the nut is inserted over the the bolt so that the first bolt element and the second bolt element are prevented from separating apart along the first axis, and the first nut element and the second nut element are prevented from separating apart along the second axis, thereby preventing the first bolt element from separating apart from the second bolt element and preventing the first nut element from separating apart from the second nut element.

8. Apparatus for supporting a wire element through an opening in a structure, the apparatus comprising:
   a. means for engaging the wire element to resist movement thereof;
   b. a bolt adapted to be inserted into the structure opening, the bolt having a shaft portion including an internal passageway which supports the wire engaging means therein such that the bolt engages the wire engaging means, the bolt including a first portion and a second portion which are movable between a first position in which the first portion and the second portion are not joined together and a second position in which the first portion and the second portion are joined together about the wire engaging means; and
   c. a nut which is attached to the bolt in a manner that the nut engages the wire engaging means to secure the wire engaging means inside the passageway between the nut and the bolt, the nut including a first portion and a second portion, each nut portion having means for joining the first nut portion and the second nut portion together about the bolt such that an interaction of the nut and bolt causes the first bolt portion and the second bolt portion to be held together by the nut, and the first nut portion and the second nut portion to be held together by the bolt.

9. The apparatus as set forth in claim 8 wherein the first nut portion and the second nut portion are movable between a first position in which the first nut position and the second nut portion are not joined together and a second position in which the first nut portion and the second nut portion are joined together.

10. The apparatus as set forth in claim 9 wherein:
    a. the means for holding the first nut portion and the second nut portion together in the second position allows the first nut portion and the second nut portion to be separable only along a first axis thereby allowing the first and second nut portions to be placed about the wire element; and
    b. the bolt engages the nut in the second position so as to prevent the first nut portion and the second nut portion from separating apart along the first axis thereby preventing the first and second bolt portions from separating apart and preventing the first and second nut portions from separating apart.

11. The apparatus as set forth in claim 10 wherein:
    a. the bolt includes means for holding the first bolt portion and the second bolt portion together in the second position in a manner that the first bolt portion and the second bolt portion are separable only along a second axis; and
    b. the bolt engages the nut in the second position so as to prevent the first bolt portion and the second bolt portion from separating apart along the second axis.

12. The apparatus as set forth in claim 11 wherein the means for holding the first and second bolt portions together includes a male connector which is attached to the first bolt portion and which is positioned inside a female receptacle in the second bolt portion.

13. The apparatus as set forth in claim 10 wherein:
   a. the first bolt portion and the second bolt portion are separable along a longitudinal axis of the bolt so that the first bolt portion and the second bolt portion are mirror images of each other; and
   b. the first nut portion and the second nut portion are separable along a longitudinal axis of the nut so that the first nut portion and the second nut portion are mirror images of each other.

14. A method of supporting a wire element through first and second openings in a structure, the method comprising the steps of:
   a. placing the wire element through the first opening and the second opening;
   b. inserting a spacer inside the first and second openings such that the spacer engages the wire element to resist movement thereof;
   c. placing a shaft portion of a first bolt element through the first opening and the second opening and about the wire element;
   d. placing a head portion of the first bolt element against the structure;
   e. moving a shaft portion of a second bolt element from a first position in which the second bolt element is separated from the first bolt element, to a second position in which the shaft portion of the second bolt element extends through the first opening and the second opening such that the first bolt element engages the second bolt element about the wire element and the spacer and such that a head portion of the second bolt element is placed against the structure;
   f. placing a first nut element and a second nut element about the wire element such that the first nut element engages the second nut element; and
   g. attaching the nut to the bolt in a manner that the nut engages the structure and such that the nut and bolt interact so that the first bolt element and the second bolt element are held together by the nut, and the first nut element and the second nut element are held together by the bolt.

15. The method as set forth in claim 14 wherein during the step of placing the first and second nut element about the wire element, the first and second nut elements are moved from a first position in which the first nut element is separated from the second nut element to a second position in which the first nut element engages the second nut element.

16. The method as set forth in claim 15 wherein:
   a. during placing the first nut element and the second nut element about the wire, the first nut element engages the second nut element such that the first nut element and the second nut element are held together in the second position in a manner that the first nut element and the second nut element are allowed to separate apart only along a first axis; and
   b. during the step of attaching the nut to the bolt, the nut engages the bolt in the second position so as to prevent the first nut element and the second nut element from separating apart along the first axis thereby preventing the first nut element and the second nut element from separating apart.

17. The method as set forth in claim 16 wherein:
   a. during placing of the first bolt element and the second bolt element about the wire element, the first bolt element engages the second bolt element such that the first bolt element and the second bolt element are held together in the second position in a manner that the first bolt element and the second bolt element are allowed to separate apart only along a second axis; and
   b. during the step of attaching the nut to the bolt, the nut engages the bolt in the second position so as to prevent the first bolt element and the second bolt element from separating apart along the second axis thereby preventing the first bolt element and the second bolt element from separating apart.

18. The method as set forth in claim 17 wherein during the step of attaching the nut to the bolt, the nut is threaded to the bolt so that the first nut element and the second nut element are prevented from separating apart along the first axis, and the first bolt element and the second bolt element are prevented from separating apart along the second axis.

19. Apparatus for engaging a wire element in a structure opening comprising:
   a. means for engaging the wire element to resist movement thereof;
   b. a bolt which is inserted into the structure opening, the bolt having a shaft portion including an internal passageway which supports the wire engaging means therein such that the bolt engages the wire engaging means, the bolt including a first portion and a second portion which are movable between a first position in which the first portion and the second portion are not joined together and a second position in which the first portion and the second portion are joined together about the the wire engaging means; and
   c. a nut which is attached to the bolt in a manner that the nut engages the wire engaging means to secure the wire engaging means inside the passageway between the nut and the bolt, the nut including a first portion and a second portion, each nut portion having means for joining the first nut portion and the second nut portion together about the bolt such that an interaction of the nut and bolt causes the first bolt portion and the second bolt portion to be held together by the nut, and the first nut portion and the second nut portion to be held together by the bolt.

20. The apparatus as set forth in claim 19 wherein:
   a. the bolt includes means for holding the first bolt portion and the second bolt portion together in the second position in a manner that the first bolt portion and the second bolt portion are separable only along a first axis; and
   b. the bolt engages the nut in the second position so as to prevent the first bolt portion and the second bolt portion from separating apart along the first axis.

* * * * *